United States Patent [19]

Gelardi et al.

[11] 4,385,693

[45] May 31, 1983

[54] ORIGIN IDENTITY INSERT FOR PACKAGED CASSETTES

[76] Inventors: Anthony L. Gelardi, Box 127; Paul J. Gelardi, P.O. Box 127, both of, Cape Porpoise, Me. 04014

[21] Appl. No.: 238,830

[22] Filed: Feb. 27, 1981

[51] Int. Cl.³ ................... B65D 85/67; B65D 25/54; B65D 75/54
[52] U.S. Cl. ............................ 206/387; 206/45.31; 206/45.33; 206/459
[58] Field of Search .................. 206/387, 45.31, 459, 206/45.33

[56] References Cited

U.S. PATENT DOCUMENTS

| | | | |
|---|---|---|---|
| 3,306,437 | 2/1967 | Nelson | 206/459 |
| 3,622,102 | 11/1971 | Fox | 206/387 |
| 3,754,639 | 8/1973 | Gellert | 206/387 |
| 4,234,079 | 11/1980 | Otake | 206/459 |

FOREIGN PATENT DOCUMENTS 1224737 5/1968 United Kingdom ............... 206/387

Primary Examiner—William T. Dixson, Jr.
Attorney, Agent, or Firm—Staas & Halsey

[57] ABSTRACT

An insert device for use with original pre-recorded tape cassette cartridges for the purpose of enabling identifying markings to be readily viewed from the packaged and covered tape cassette cartridge for identifying each of same as being an original and not a counterfeit. The insert comprises an elongated body member of semi-flexible opaque material, and provided therethrough at least one aperture for permitting the viewing of identifying markings on a tape cassette cartridge around which the insert is enfolded. Normally the insert and tape cassette cartridge will be further enclosed in a container of box-like construction having tape spool hub locks therein and at least a portion thereof being transparent. Preferably, the entire package consisting of box, insert, and tape cassette cartridge will be further enclosed in a tightly sealed outer wrapping of transparent material.

9 Claims, 5 Drawing Figures

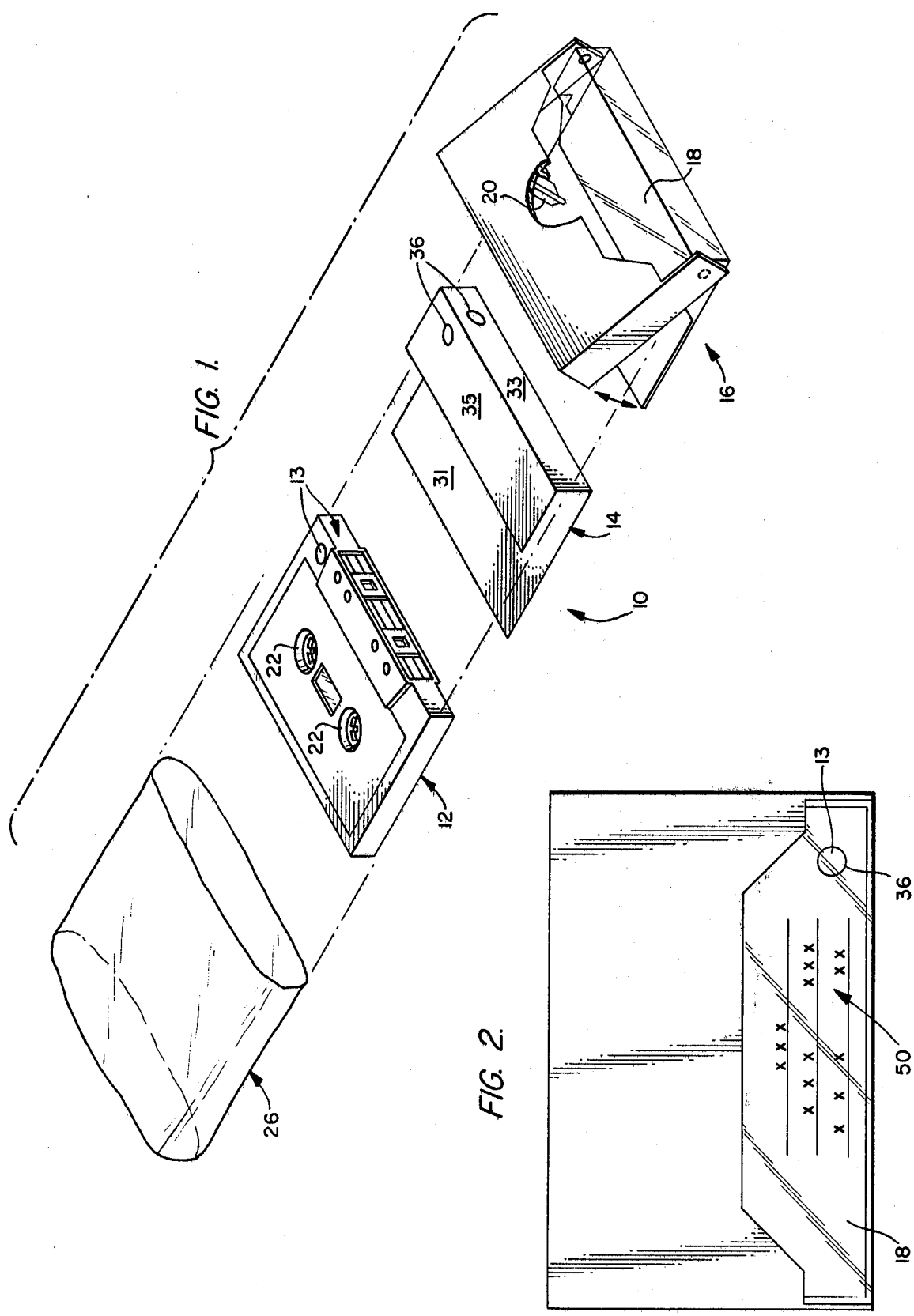

ORIGIN IDENTITY INSERT FOR PACKAGED CASSETTES

BACKGROUND OF THE INVENTION

1. Field of the Invention

This invention relates generally to tape cassettes as packaged for distribution and sales together with an insert package therewith to enable the quick identification of the origin of the tape cassette.

2. Description of the Prior Art

A common problem with known packaging arrangements for tape cassettes is that they do not permit any specific identifying logo, color, or brand embedded or otherwise provided on the tape cassette itself to be seen through the packaging and container material for the tape as normally prepared for distribution and sales. Thus, with conventional type packaging materials there is no way for someone picking up the packaged cassette to readily tell the origin thereof, which, of course, makes it very difficult to determine if the package contains an original legally manufactured tape cassette, or a counterfeit.

It is quite commonly known prior art to provide a covering insert for partially enclosing the pre-recorded tape cassette. This covering insert normally is provided with information regarding material recorded on a tape cassette as well as other identifying and/or sales material. However, it is quite common for counterfeit tapes as packaged to also contain such inserts.

A very basic problem with known type tape cassette packages is that there is no way to readily identify that the tape cassette as pre-recorded is an original and not a bootleg or counterfeit. It is very desirable that the manufacturer, record company, distributor, dealer, or even the Federal Bureau of Investigation be able to pick up a completed packaged tape cassette and quickly determine if it is an original, or perhaps counterfeit.

Existing prior patents which may be pertinent to this invention are as follows: Meille (U.S. Pat. No. Des. 252,835) Sept. 4, 1979; Johnson et al (U.S. Pat. No. 3,233,728) Feb. 8, 1966; Devejian (U.S. Pat. No. 3,587,841) June 28, 1972; Solomon (U.S. Pat. No. 3,638,788) Feb. 1, 1972; Stone (U.S. Pat. No. 3,756,384) Sept. 4, 1973; and Roccaforte (U.S. Pat. No. 3,998,324) Dec. 21, 1976.

The U.S. Pat. No. Des. 252,835 shows a plurality of holes in the outer container which apparently provide for some type of identifying data for the outside container. However, whatever these holes are, they appear on the outer container rather than on an insert surrounding a cassette as in subject application.

The Johnson et al U.S. Pat. No. 3,233,728 is for a reel supporting structure and while the two opposing panels 14 and 15 which are joined by an end wall 16 have a width substantially the same width as the reel to be supported by member 5, this insert structure is for an entirely different purpose and use than that of subject invention.

The patent to Devejian (U.S. Pat. No. 3,587,841) is cited for general interest, see FIG. 1. No holes are provided in this structure either.

The patent to Solomon (U.S. Pat. No. 3,638,788) shows a sheet of material being used to enclose a tape cassette, but no holes for the purpose of that disclosed by subject invention.

The patent to Stone (U.S. Pat. No. 3,756,384) shows a viewing window to permit identifying indicia imprinted on an insert to be viewed through the exterior of the carton. However, the viewing windows are provided in the carton itself, rather than in an insert which is contained within an outer protective container.

The patent to Roccaforte (U.S. Pat. No. 3,998,324) is cited as of general interest for the insert structure, but no apertures or other openings are provided so the purpose of the subject invention cannot be effected.

None of the known prior devices provide the new and novel features of the present invention.

SUMMARY OF THE INVENTION

An object of the present invention is to provide an insert device for partially covering and surrounding a pre-recorded tape cassette cartridge which is then inserted into a holding and shipping container which then in turn is packaged in transparent plastic material, preferably shrunk fit therearound. The insert device is provided with suitable apertures to permit identifying markings provided on the tape cassette cartridge to be seen through all the packaging material.

Another object of this invention is to provide a very simple and easily foldable insert for covering a cassette cartridge, the insert having desired information printed on the outside thereof, and which insert will also permit quick and easy identification of the origin of the pre-recorded tape cassette cartridge with which it is used.

A further object of this invention is to provide a packaging arrangement for original pre-recorded tape cassettes to be distributed and sold to the trade and general public which will contain structure permitting ready identification of the original tape cassette from a particular manufacturer or distributor, and thus make it easy for anyone desiring to do so to determine whether or not the tape cassette contained within the package is a legal original or an illegal counterfeit.

A still further object of this invention is to provide a simple insert per se which may be distributed to tape cassette recorders and manufacturers prior to the packaging of their pre-recorded releases and which will enable later easy identification and determination that the tape cassette is an original.

The present invention has a number of new and original features. One of these is in the fact that the insert device for permitting quick and easy identification of the authenticity of a pre-recorded tape cassette with which the insert is used, can be readily manufactured and mass produced and distributed and sold at a very economical cost, and yet will greatly increase the ease of checking for authenticity of the tape cassette with which it is used.

The insert device consists of an elongated substantially rectangular structure of approximately the same width as conventional tape cassette cartridges, and of approximately the length of one and one-half the depth of a cassette cartridge side. In addition, each insert device is provided with a suitable aperture, or plurality of apertures, for matching up and aligning with identifying markings as provided on the original tape cassette cartridge. Thus, when the insert device is appropriately folded and applied substantially around the pre-recorded tape cassette cartridge, the aperture, or plurality of apertures, will permit the quick visual verification of the point of origin of the pre-recorded tape cassette.

Another important feature of the present invention is that the insert device can be used for packaging a legally manufactured tape cassette in the same manner as presently is done in the field. Thus, no substantial changes, or increases in cost are incurred. After the insert is suitably applied around the pre-recorded tape cassette cartridge, the insert and tape cassette cartridge therewithin are suitably inserted into a protective container, commonly called in the trade a, "NORELCO BOX", which is provided with two extending projections for fitting into the tape spool hubs and in conjunction with the drive projections therewith, suitably lock the hubs against rotation and tape unwinding. Normally, these boxes have portions which are transparent, thus permitting the insert and also any identifying material, as viewable through the apertures in the insert to be seen from outside the box. After completion and enclosing of the tape cassette within the box, it is then suitably wrapped with transparent plastic material, which is then preferably shrunk fit to form a compact, secure, and protected package.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an exploded perspective view of the items used, including the insert device of the present invention, in packaging a pre-recording tape cassette cartridge.

FIG. 2 is a top plan view of a cassette cartridge, box holder and insert device of the present invention.

DESCRIPTION OF THE PREFERRED EMBODIMENTS

Figure 3:
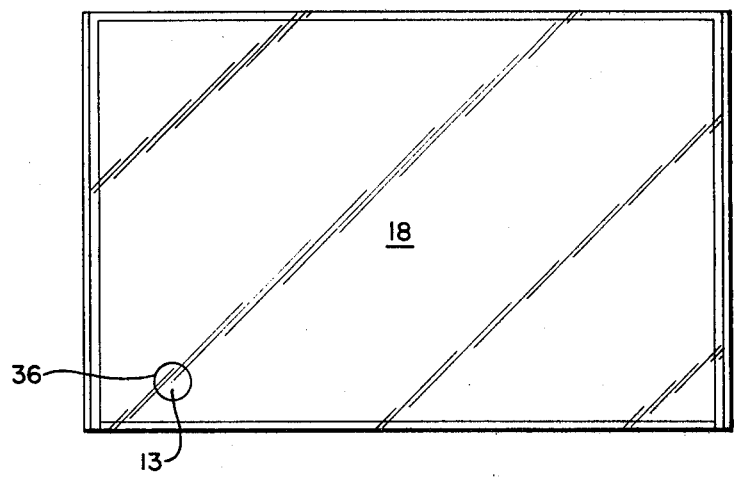
FIG. 3 is a bottom plan view thereof.

Referring to FIG. 1 of the drawings, reference 10 indicates in general, an exploded view of all the components for packaging a pre-recorded tape cassette cartridge. The original pre-recorded tape cassette cartridge 12 is partially enclosed by the insert device 14 of the present invention, and then inserted into position within the pivotally mounted and normally transparent top cover 18 of a Norelco Box 16. This Norelco Box is normally provided with upstanding projections 20 which mate and engage with complementary drive projections mounted within the conventional cassette tape spool hubs 22. Thus, when the pivotally mounted top cover portion 18 is closed, the projections 20 pass through the central openings of the cassette tape spool hubs 22 and by engagement with the recesses and projections provided therewithin, block the tape spool heads against rotation. After assembly of the tape cassette into the NORELCO BOX container, the box is then normally covered with transparent outer material of plastic which is then preferably shrunk fit into completed form. Of course, cellophane or other wrapping material may be used if desired. Normally, once the package has been completed, it is not readily possible to thereafter check the tape cassette cartridge within the package.

However, by use of the tape insert device of the present invention, any identifying logo, identifying color, or even brand name embedded or otherwise provided on the cassette cartridge itself can be readily visualized and seen through the insert, NORELCO BOX, and transparent outer protective covering. Another purpose of the box and outer covering is to prevent tampering of the tape cassette after packaging, in addition to the obvious protection against moisture and contaminants.

Figure 4:
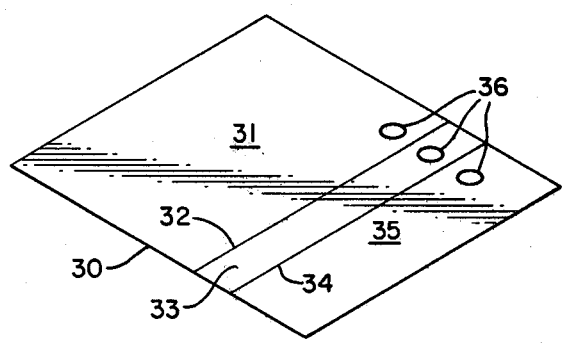
FIG. 4 is a perspective view of the insert device per se.

As best seen in FIG. 4 of the drawings, the preferred embodiment of the insert device of the present invention consists of three apertures or holes 36 suitably provided at spaced portions of the insert. Fold lines 32 and 34 normally are indicated or inscribed on the insert device with the proper spacing so that when the insert is folded along these lines, a primary portion 31 of the insert is provided which will substantially cover one entire side of a conventional cassette cartridge, a median or edge covering portion 33 is provided, and a portion 35 is provided which will cover about one-third of the opposite side of the tape cassette cartridge. Of course, the portion 35 must be short enough so that the holes of the tape cassette cartridge opposite the tape spool hubs are not covered so that the locking projections 20 of the cassette box can pass therethrough and perform their desired function.

Preferably the manufacturer and/or recorder of the original material on the tape of the cassette cartridge applies suitable identifying markings on the cartridge which will be easily viewed through the apertures 36 of the insert after the overall package has been assembled and completed. Such markings, indicated by reference 13 in FIG. 1, can be a suitable logo to identify a particular manufacturer, a particular color, or even a brand name or the like applied in the proper position as indicated. Any or all of the markings, if properly and appropriately applied by the manufacturer, recorder or originator of the original pre-recorded tape cassette will later be important protection because of the identity permitting and verification feature of the insert device of the present invention.

Figure 5:
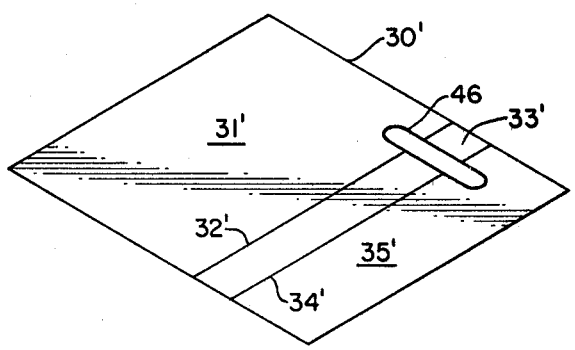
FIG. 5 is a modified embodiment of the insert device per se.

Another embodiment of the present invention is shown in FIG. 5 of the drawings. In this Figure, items corresponding to those of FIG. 4, are identified by the same reference numeral with a prime thereafter. The modification appears as the elongated slot 46 which is substituted for the plurality of apertures 36. In some applications it may be more desirable to use such a slot 46, because in the case of the application of a brand name or the like, such may be long enough and of such size that the apertures 36 of the FIG. 4 embodiment would not permit the viewing of the entire name. Thus, by the use of a slot such as 46, all or at least more of long identifying markings can be seen. Of course, it is envisioned that other shapes than the holes 36 or the slot 46, may be used with the insert device of the present invention. Of course, other promotional, identifying and explanatory material may be pre-printed upon the inserts as desired by the people in the industry. Such material is shown and indicated by reference numeral 50 in FIG. 2.

The identifying material and markings as provided on the original pre-recorded tape cassette cartridge are normally near the edge of the cartridge having the tape recording head access openings therein. Thus, when the insert is enfolded around the cassette cartridge, the middle or median portion 33 thereof will cover and afford protection for the tape leader of the recorded tape as wound upon the tape spools of the cassette cartridge.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. An identification permitting device for cassette packages comprising;
   a pre-recorded tape cassette cartridge having at least one identifying marking provided thereon for indicating a particular supplier or manufacturer;
   a container for holding said cassette cartridge with at least a portion thereof being transparent so that said identifying marking can be seen therethrough when the tape cassette cartridge is mounted therewithin;
   insert means for normally covering a substantial portion of the cassette cartridge; and
   said insert means provided with further means for permitting viewing of said at least one identifying marking when the insert is in place substantially around and covering the tape cassette cartridge.

2. The device of claim 1, together with an outer sealed covering of transparent material for overall protection of the entire package while still permitting viewing of the identifying markings of the tape cassette cartridge.

3. The device of claim 1, wherein said insert means includes a partial sleeve of opaque material covering one entire side and one edge of said cassette cartridge, and also covering less than one-half of the other side of said cassette cartridge thus permitting tape spool hub engaging projections as normally provided on the container to enter the tape cassette spool hubs and secure same against inadvertent rotation and unwinding of the tape material of the cassette cartridge.

4. The device of claim 3, wherein said further means includes at least one aperture in the insert sleeve which permits the easy and ready viewing of the cassette cartridge identifying marking.

5. The device of claim 4, wherein said further means consists of three apertures spaced appropriately in the insert sleeve so as to expose a side, edge and the other side identifying markings as provided on the tape cassette cartridge.

6. The device of claim 4, wherein said further means consists of an elongated slot spaced in the insert so as to expose a side, edge, and other side identifying markings as provided on the tape cassette cartridge.

7. An insert for covering at least partially a pre-recorded tape cassette cartridge having identifying markings thereon comprising;
   an elongated rectangular body of semi-flexible opaque material;
   two fold lines provided in one-half of said rectangular body to enable the easy folding thereof around a cassette cartridge so that all of one side, one edge, and less than one-half of the other side are covered thereby; and
   aperture means provided in said body at a pre-determined portion thereof to permit the ready viewing of identifying markings provided on the cassette cartridge for the purpose of verifying said cassette cartridge to be an original rather than a counterfeit.

8. The insert of claim 7, wherein said aperture means consists of a plurality of three holes in said body.

9. The insert of claim 7, wherein said apertures means includes a slot of sufficient length to enable identifying markings on the side, edge, or other side of the cassette cartridge to be easily and readily viewed after said insert has been folded around the cassette cartridge.

* * * * *